United States Patent [19]

Hoffman et al.

[11] 4,036,328
[45] July 19, 1977

[54] DISC BRAKE APPARATUS SUITABLE FOR BICYCLES

[75] Inventors: Neil R. Hoffman, Mequon; Johannes H. Jansen, Milwaukee, both of Wis.

[73] Assignee: Brake Engineering, Inc., Milwaukee, Wis.

[21] Appl. No.: 683,484

[22] Filed: May 5, 1976

Related U.S. Application Data

[62] Division of Ser. No. 606,711, Aug. 21, 1975, Pat. No. 3,985,391.

[51] Int. Cl.² ............................................. F16D 55/16
[52] U.S. Cl. ...................................... 188/26; 74/107; 188/72.2; 188/72.3; 188/72.7; 188/72.9; 192/70.23; 192/70.28; 192/93 A
[58] Field of Search ................ 188/26, 344, 722, 2 D, 188/72.3, 72.7, 72.9; 192/93 A, 70.23, 70.28; 74/107

[56] References Cited

U.S. PATENT DOCUMENTS

| | | | |
|---|---|---|---|
| 2,063,443 | 12/1936 | Lambert | 188/72.2 X |
| 2,373,572 | 4/1945 | Lambert | 188/72.2 X |
| 3,406,793 | 10/1968 | Buyze | 188/72.2 |
| 3,675,741 | 7/1972 | Frei et al. | 188/26 |
| 3,765,511 | 10/1973 | Toyomasu | 188/26 |
| 3,837,438 | 9/1974 | Hollnagel | 188/72.2 |
| 3,878,921 | 4/1975 | Kibler et al. | 188/26 |
| 3,927,736 | 12/1975 | Bergles | 188/26 |

*Primary Examiner*—George E. A. Halvosa
*Attorney, Agent, or Firm*—Ira Milton Jones

[57] ABSTRACT

The rotor of a disc brake apparatus for bicycles comprises a spider that flatwise overlies the outer face of one spoke flange on a wheel hub and is secured by spokes that have their hook portions extending through it and that spoke flange. A flat annular disc has radially inwardly projecting tabs that are secured to the spider and hold the disc in axially spaced relation to the spokes. A U-shaped caliper body straddles an edge portion of the disc. On a shorter leg the body has a fixed brake pad; on its longer leg it carries a movable brake pad that has a compound motion for self-energization. The body is movable in directions parallel to the wheel axis and is carried, in part, by a cup-shaped adapter coaxial to the wheel shaft and confined between a bearing cone for the wheel and an adjacent frame portion. Portions of the body straddle an elongated frame member to confine the body against rotation around the adapter.

9 Claims, 9 Drawing Figures

DISC BRAKE APPARATUS SUITABLE FOR BICYCLES

This application is a division of our copending application Ser. No. 606,711, filed Aug. 21, 1975, now U.S. Pat. No. 3,985,391.

This invention relates to disc brake devices and is more particularly concerned with a disc-type brake assembly that is suitable for bicycles and similar vehicles.

Heretofore the customary braking system for a touring type bicycle equipped with a change-speed gear shift has consisted of a pair of hand operated caliper assemblies, one for each wheel, each comprising a pair of friction pads that clampingly engaged the rim of its wheel. Each caliper assembly was individually controllable from a hand lever on the handlebars, connected with the caliper assembly by means of a cable.

The rate at which a bicycle would be decelerated by means of a caliper brake assembly was dependent upon the clamping force applied to the friction pads, and this, in turn, depended upon the force that the rider applied to the actuating lever. Because that lever was hand actuated, the reasonably expectable maximum force that could be applied to it was on the order of 35 pounds. Some persons, of course, have hands strong enough to exert substantially more than a 35 pound clamping force, but many cannot comfortably achieve anywhere near that value.

Other things being equal, the clamping force that has to be exerted upon the friction pads of a caliper brake system in order to bring a bicycle to a stop within a given distance from a given speed depends upon the weight of the rider, who may be a child weighting 70 to 80 pounds, or a adult weighing well over 200 pounds. Obviously there is no necessary relationship between the weight of a bicyclist and the maximum clamping force that he can exert upon a brake lever.

The clamping force necessary to achieve a given deceleration with such prior brake systems also varied with the condition of the wheel rim and could be very much higher when the rim was wet than when dry.

The maximum clamping force that could be exerted by the rider was an important consideration with prior caliper brake systems because of the need for having a rather low mechanical advantage in the actuating mechanism of the system. The rim of a bicycle wheel is seldom absolutely true. When the wheel is rotating with its axis fixed, the rim will usually be seen to have at least a slight amount of wobble or run-out, especially if it has had a certain amount of use. In the released condition of a caliper brake, both friction pads had to be spaced from the wheel rim to ensure that they did not drag against it. To accommodate a reasonable amount of run-out, the friction pads had to swing through a relatively large distance between their released and braking positions. This meant that there had to be a relatively large travel of the brake pads for a given amount of movement of the actuating lever, so that there was an unfavorable relationship between the force that the rider applied to the brake actuating lever and the resultant clamping force of the friction pads against the wheel rim.

By reason of these factors, many bicyclists did not have sufficiently strong hands to achieve optimum braking action with a caliper brake system, especially in wet weather.

By contrast, in a disc brake system having brake pads that engage a disc-like rotor, the rotor can ordinarily have sufficient rigidity to maintan flatness to within very small tolerance limits, and consequently the brake pads need to have only very small travel between their braking and released positions. This means that the actuating mechanism can be arranged for substantially greater mechanical advantage than would be feasible in a caliper brake system.

A further advantage of a disc brake system is that it ca be made self-energizing to some extent. When one of the brake pads engages the rotor, friction between the rotor and the brake pad urges the brake pad in the direction of rotor rotation. Such drag of the rotor upon the brake pad can be used to increase the friction-producing force with which the brake pad engages the rotor if the brake pad is arranged for an oblique motion between its released and rotor-engaging positions, so that it has both axial and circumferential components of such motion.

Thus, as compared with heretofore conventional caliper brake systems, a disc brake system offers the very important advantage of being able to afford optimum braking action in response to relatively small actuating forces.

Another advantage of a disc brake system is that its rotor disc and brake pads can be designed to cooperate with one another for optimum braking under all conditions. In the case of prior caliper brakes that cooperated with the rim of a bicycle wheel, the material of which the rim was made had to be selected for its suitability to the functions of a wheel rim rather than for its ability to serve as a brake rotor; and, correspondingly, the material of the brake shoes had to be selected for compatibility with the rim material and could afford only such braking action as would not cause damage to the rim. It was primarily because of the need for making such compromises that prior bicycle caliper brake systems were notoriously ineffective in rainy weather, precisely at times when reduced visibilities might make good braking especially important from a safety standpoint.

By contrast, the rotor disc and brake pads of a disc brake system can be made of materials selected solely with a view to their effectiveness, compatibility and durability for braking purposes, and those skilled in the design of brake apparatus can readily achieve a disc brake system that is as effective in a cloudburst as in a drought.

Hence, a satisfactory disc brake system offers the possibility of not only greater comfort and convenience to the bicyclist but of materially greater safety as well. But, important as these advantages are, they must not be attained at the sacrifice of other desirable factors.

As with an airplane, the performance of a bicycle is very much affected by weight. Every ounce that must be added to a bicycle is cause for concern. Having in mind that a complete caliper brake system can weigh less than one pound, it is apparent that a bicyclist is likely to reject a disc brake system that would be substantially heavier — notwithstanding its greater safety and convenience — in view of the fact that such a disc brake system would tax his energy almost constantly when he was riding but would offer its advantages only during short and relatively infrequent braking intervals.

It is also important that a disc brake system for bicycles be capable of being installed on a bicycle without requiring any material modification of the conventional bicycle structure, without detracting from the appearance of the bicycle, and without interfering with normal operation of the bicycle or with the installation of commonly used accessories such as luggage carriers and fenders. A particular problem in this respect is presented by the disc-like rotor that comprises an essential part of a disc brake system. The rotor must be so mounted on the wheel as to be constrained to rotate therewith and to be spaced axially to one side of all of its spokes so that both faces of the disc are accessible to brake pads on a caliper assembly which straddles an edge portion of the rotor. Nevertheless, the rotor assembly must be compact enough to fit into the small space between the wheel and the frame, and neither it nor the caliper assembly can interfere with installation or removal of the wheel or with the fore-and-aft adjustment of the rear wheel by which chain tension is maintained.

It is hardly necessary to add that a satisfactory disc brake system for a bicycle will be low in cost, sturdy, dependable and trouble free.

Having in mind these requirements, it is the general object of this invention to provide a disc brake system which is in all respects suitable for bicycles, which can be readily designed to have equally good braking action in wet and dry weather, and which is self-energizing so that optimum braking action can be obtained with very small actuating force.

Another general object of the present invention is to provide a self-energizing brake system for bicycles that is substantially safer and more convenient than the caliper brake systems heretofore conventional on gear-shift bicycles, and which can be readily installed on a bicycle as a replacement for a caliper brake assembly, utilizing the same hand lever previously employed for actuation of the caliper brake assembly but requiring the exertion of substantially less force upon that lever to obtain a superior braking action.

A further object of the invention is to provide a self-energizing disc brake assembly that can be quickly and easily installed on a bicycle without the need for modifying any of the heretofore conventional bicycle structure and which can be mass produced in a single model that is adaptable to almost all bicycles, regardless of make or size.

Another specific object of this invention is to provide a caliper assembly for a disc-type brake that is especially well suited for bicycles, which caliper assembly is held in place by nuts conventionally present on a bicycle to secure its rear wheel to one side of its frame and by bumpers or pads on the caliper assembly that have clamping but non-marring engagement with one of the longitudinal frame members of the bicycle, said caliper assembly thus being capable of being installed or removed as easily as the rear wheel itself and more or less incidentally to installation removal of that wheel.

It is also a specific object of this invention to provide a simple disc-type brake for a wheel that normally rotates in only one direction, said disc-type brake being to some extent self-energizing and comprising a disc-like rotor constrained to rotate with the wheel, a U-shaped body that straddles a portion of the rotor, a first brake pad fixed to one leg of the body, an opposing brake pad carried on the other leg of the body for movement relative to the body out of a normal released position in a direction generally towards the first brake pad but with a component of motion in the direction of rotor rotation, and means so mounting the body on structure which carries the wheel that the first brake pad can be engaged against the rotor by reaction of the body to force which said opposing brake pad exerts against the rotor in moving away from its said released position.

Still another specific object of this invention is to provide a disc-type brake assembly which is particularly suitable for bicycles and similar light vehicles and which has an actuating mechanism that is well adapted for connection with a lever intended to be actuated by the hand, said actuating mechanism comprising a cable and means by which lengthwise movement of the cable is translated into movement of a friction pad in a smooth, direct and very efficient manner.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 9 is a sectional view taken generally on the plane of the line 9—9 in FIG. 1 but showing a modified form of spider.

Figure 1:
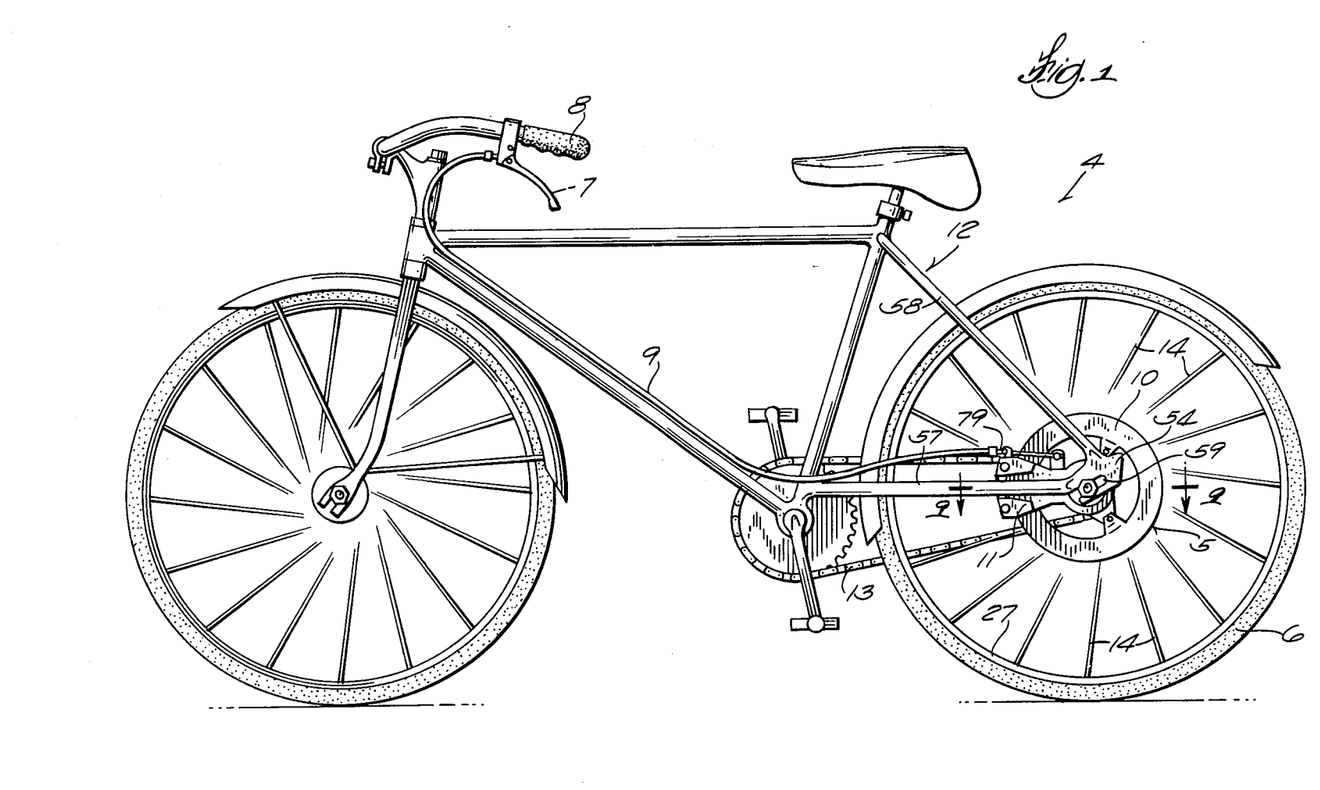
FIG. 1 is a side view of a bicycle on which is installed disc brake apparatus embodying the principles of this invention.

Referring now to the accompanying drawings, the numeral 4 designates generally a bicycle on which there is installed disc brake apparatus embodying the principles of this invention, designated generally by 5. The brake apparatus is illustrated as arranged for cooperation with the rear wheel 6 of the bicycle and as intended for actuation by means of a more or less conventional hand lever 7 on the handlebars 8, which hand lever is connected with the brake apparatus by a cable 9.

For purposes of example the brake apparatus 5 is shown and described only as applied to the rear wheel of a bicycle, but it will be understood that the principles of the invention are readily adaptable to front bicycle wheel installations, and also to motorcycles and certain other types of vehicles, as well as generally to the braking of wheels and other rotary elements that revolve in one direction. On a bicycle, the advantages of the invention are of particular importance with respect to the rear wheel, inasmuch as the rear wheel should normally receive more braking force than the front one.

In general the brake apparatus 5 comprises a flat, annular rotor or disc 10 that is concentric to the rear wheel 6 and is constratined to rotate with it, and a caliper assembly 11 that is secured to the bicycle frame 12 adjacent to the rear wheel, at the side of the frame that is opposite the chain 13. The rotor 10 is spaced axially to one side of all of the spokes 14 of the wheel and is between the spokes and the frame. Thus the rotor has an axially inner flat surface 15 which faces the wheel spokes and an opposite outer flat surface 16.

The caliper assembly 11 comprises a body 11' that is generally U-shaped as viewed edgewise of the rotor, but with one of its legs 17 substantially longer than its other leg 18. The body 11' straddles an edge portion of the rotor, with its longer leg 17 overlying the outer surface 16 of the rotor and its shorter leg 18 overlying the inner rotor surface 15. A relatively fixed brake pad 19 is secured to the shorter leg 28, in flatwise opposing relationship to the inner rotor surface 15; and a relatively movable brake pad 20 is carried on the longer leg 17 in opposing relationship to the outer rotor surface 16.

Contrary to generally conventional practice, the caliper body 11' is so mounted on the bicycle frame 12 (as explained hereinafter) that it can have limited motion in directions parallel to the wheel axis. The reason for such mounting of the body is to enable both of the brake pads 19 and 20 to frictionally engage the rotor 10 during brake application, even though only the brake pad 20 is movable relative to the caliper body. When the movable brake pad 20 engages the outer surface 16 of the rotor and exerts an axially inward force against it, there is of course an opposite reaction upon the caliper body by which that body is moved in the axially outward direction to carry the fixed brake pad 19 into engagement with the inner surface 15 of the rotor. Hence the freedom of the body for movement allows the brake pads to exert opposed and balanced clamping forces upon the rotor.

Turning now to a more specific description of the apparatus, and considering first the rotor 10, it comprises a flat annular member 23, which constitutes the rotor disc itself, and a substantially flat mounting portion or spider member 24 by which the disc portion 23 is secured to the wheel 6. The two members are connected by means of suitable fasteners such as bolts 25 secured by nuts 26.

For an understanding of the spider member 24 and its connection to the wheel 6, it is necessary to observe that a wire-spoked wheel such as that for a bicycle has a rim 27 that is connected by means of the elongated wire spokes 14 to a hub 28 in which bearings (not shown) are housed and to which a chain sprocket 29 may be concentrically anchored. On the hub 28 there are a pair of radially outwardly projecting cicumferential spoke flanges 30, 30', one near each end of the hub, to which the spokes 14 are secured at their inner ends. Each spoke flange has a series of holes in it, at equal circumferential intervals around it. Each spoke has at its inner end a short laterally projecting hook portion 31 that terminates at an enlarged head 32. This hook portion is received in one of the holes in a spoke flange, with the head 32 overlying one face of the flange and a portion of the main length of the spoke overlying the opposite face of the flange.

The spokes of the wheel are of course equally divided between the two spoke flanges. Furthermore, half of the spokes connected to each spoke flange have their heads overlying the axially inner face of that flange; the other half have their heads overlying its axially outer face. The spokes that have their heads at the axially inner face of a spoke flange, and which in part overlie its axially outerface, can be regarded as "outer" spokes 14' and are so referred to hereinafter. The remaining spokes connected with the spoke flanges are inner spokes 14". Inner and outer spokes alternate with one another around the spoke flange.

The spider member 24 flatwise overlies the axially outer face of the spoke flange 30 that is remote from the chain sprocket 29. It is secured primarily by the outer spokes 14' that are connected to that spoke flange, and it can be further secured by the heads of the inner spokes connected thereto.

As shown, the spider member is a substantially flat plate in the shape of an equilateral triangle. Near each of its apexes it has a hole in which can be received one of the bolts 25 by which the disc 23 is secured to the spider. The spider also has a substantially larger hole 35 in its center, in which is received a bearing housing portion 36 of the wheel hub that extends axially outwardly beyond the spoke flange 30. Surrounding the large hole is a circle of small holes 37, one for each spoke connected to the spoke flange 30, so located as to be registerable with the holes in the spoke flange. Each small hole is large enough in diameter to receive the hook portion of a spoke. In an outer face of the spider member there are spoke receiving grooves 38, there being one such groove extending outwardly from every alternate hole 37, and each such groove extends to the outer edge of the spider member. It will be observed that the grooves 38 are lengthwise oriented in correspondence with the lengthwise orientation of the outer spokes 14' connected with the spoke flange 30.

Figure 4:
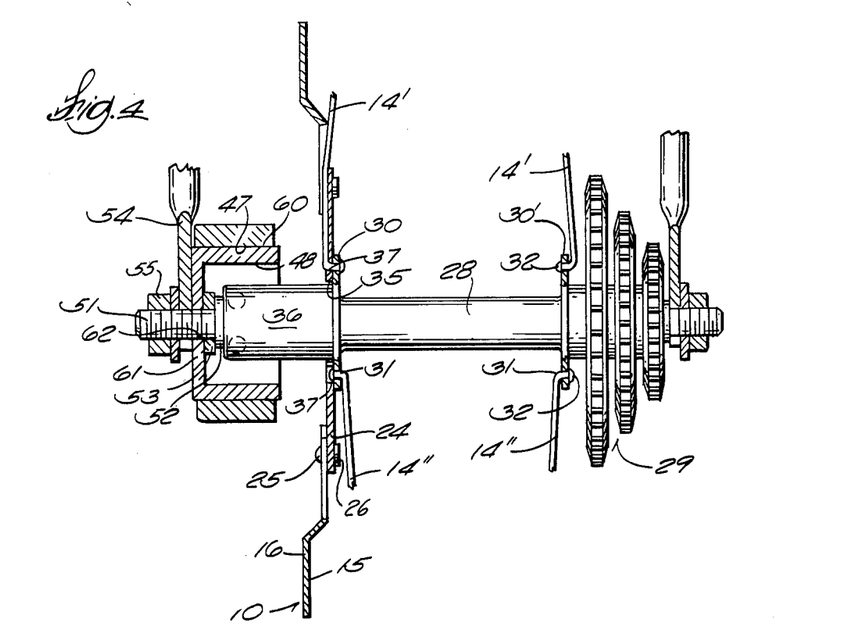
FIG. 4 is a sectional view taken on the plane of the line 4—4 in FIG. 2, on an enlarged scale.
Figure 5:
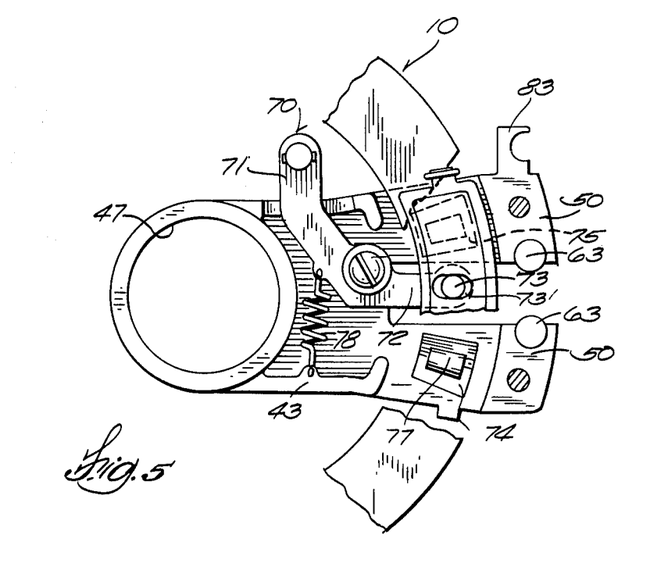
FIG. 5 is a plan view of the caliper assembly as viewed from the axially inner side of it, portions being shown broken away.

Before the spider is assembled to the wheel, all of the spokes 14 that connect with the spoke flange 30' can be installed. As shown in FIG. 4, each hole 37 in the spider can be made large enough to receive a spoke head 32, and in that case the spider can be placed on the spoke flange 30 after the inner spokes 14" connected therewith have been installed. The heads of those inner spokes are received in those of the holes 37 from which grooves do not extend, to enable the spider to flatwise adjoin the spoke flange 30. The outer spokes 14' that connect to the spoke flange 30 are then installed in a generally conventional manner, but through the spider as well as through the spoke flange.

Alternatively, as shown in FIG. 9, the holes 37 in the spider can be made small enough so that the spoke heads 32 will not pass through them. In that case the spider is set in place on the spoke flange 30 before any spokes are connected to it, and the hook portions of all of the spokes extend through the spider as well as through that spoke flange. The spider will then be held in place by the heads on the inner spokes, as well as by the outer spokes.

In any case, the spider is flatwise contiguous to the outer face of the spoke flange 30 and has its grooves 38 opening axially outwardly.

It will be evident that the spider is snugly flatwise confined between the outer spokes and the spoke flange and is firmly held against rotational or other edgewise displacement by the hook portions of the spokes. The spider presents no substantial interference to conventional installation of spokes to the spoke flange 30, inasmuch as the annular disc member 23 need not be attached to the spider until after all of the spokes are installed.

The annular disc member 23 that cooperates with the illustrated spider has three circumferentially equispaced tab-like connecting arms 39 projecting radially inwardly from its inner circumference, preferably formed integrally with its annular portion. Each of these arms is bent obliquely out of the plane of the disc, all extending in the same axial direction, but the inner end portions of the several arms, which flatwise overlie the apex portions of the spider, lie in a common plane. Each inner end portion of an arm has a bolt hole which can register with a bolt hole in the spider to receive one of the bolts 25 that connect the disc member to the spider member.

Because of the axial inclination of the radially outer portions of the arms, the annular portion of the disc member that constitutes the rotor proper is in axially outwardly spaced relation to the spider and is therefore spaced a substantial distance from all of the spokes of the wheel. Hence the shorter leg 18 of the caliper body, which carries the fixed brake pad 19, is readily accommodated in the space between the rotor and the spokes.

As illustrated the caliper body 11' comprises a larger main body member 43 on which the movable brake pad 20 is mounted and which provides for attachment of the caliper assembly to a bicycle frame, and a smaller body member 44 that comprises the shorter leg 18 of the U and carries the fixed brake pad 19. Both body members can be made as aluminum castings. The body members 43 and 44 have flat surfaces 45, 45', respectively, at which they join one aother, and those opposingly engaged surfaces lie in a plane that substantially coincides with the plane of the rotor disc. The two body members are connected by bolts 46.

As viewed along the wheel axis, the main body member 43 is substantially elongated and is bifurcated at its end that is connected with the smaler body member 44. It has a large hole 47 through its other end. In the hole 47 there is received a cup-shaped hub adapter 48 which is fixed concentrically to the wheel and on which the caliper body has a sliding fit. As the description proceeds, it will be seen that the body is free for axial sliding motion on the hub adapter but is confined against rotation around it by abutments that comprise outwardly projecting bosses 49 on the bifurcations 50 of the main body member, which abutments engage opposite sides of one of the elongated frame members of the bicycle.

Before considering the mounting of the caliper assembly 11 in more detail, it should be pointed out that a conventional bicycle wheel assembly comprises a relatively stationary axle shaft 51 which extends coaxially through the wheel hub 28 and which has threaded end portions that project substantial distances beyond the wheel hub. On the end portion of this shaft that is remote from the sprocket, a bearing cone 52 is threaded. The bearing cone projects a distance into the hub to cooperate with a bearing (not shown) therein, and it may project axially outwardly beyond the hub. There is usually a locking nut 53 threaded onto the axle shaft against the bearing cone. The bearing cone of course does not rotate with the wheel and is thus in fixed relation to the axle shaft and the frame 12. Axially outwardly of the cone the axle shaft projects through a flat wheel supporting portion 15 of the frame. A clamping nut 55 that is threaded onto the outer end portion of the shaft, when tightened, cooperates with the bearing cone or its locking nut 53 to clamp the frame portion 54 and releasably fix the axle to the frame.

Convnetially, a bicycle frame has a V-shaped portion at each side of the rear wheel. Each such V-shaped portion comprises a lower elongated member 57 that is nearly horizontal and an upper elongated member 58 that extends down to the rear end of the lower member at a substantial inclination. The flat wheel supporting portion 54 of the frame projects generally rearwardly from the junction of these two elongated members. To enable the axle shaft to be adjusted fore-and-aft, for maintenance of chain tension, the wheel supporting portion has a slot 59 in which the axle shaft is received.

The caliper body extends forwardly from the cup-shaped hub adapter 48 to have the bosses on its bifurcated front end project across the lower elongated frame member 57, above and below the same, but the rest of the caliper body is located at the inner side of that frame member and of the wheel supporting portion 54.

The cup-shaped hub adapter 48, which supports the rear end of the caliper body, has a cylindrical side wall 60 and a substantially flat end wall 61. A concentric hole 62 in its end wall receives the axle shaft 51 with a close sliding fit, and upon securement of the wheel assembly to the frame, the end wall of the hub adapter is clamped between the frame portion 54 and the bearing cone or its locking nut 53, being thus held against all movement by the tightening of the clamping nut 55.

The cylindrical side wall 60 of the hub adapter projects axially inwardly to surround the bearing cone 52 and has an inside diameter and depth such as to be spaced both radially and axially from rotating parts of the wheel assembly. The outer cylindrical surface of the hub adapter side wall, as already explained, provides a bearing support for the caliper body 11' that provides for translatory sliding motion of the body in directions parallel to the wheel axis.

The caliper body is of course confined against rotation about the hub adapter 48 by its straddling cooperation with the lower elongated frame member 57. To prevent scratching or marring of that frame member, and to provide for smooth, easy motion of the caliper body in directions parallel to the wheel axis, the caliper body carries, at the opposing faces of its bifurcations, pads or bumpers 63 of nylon or similar smooth, hard but slightly resilient material, each in the form of a cylinder which has its axis parallel to that of the wheel. Each bumper 63 is held captive in a slot 64 in its bifurcation, which slot opens laterally towards the other bifurcation. In cross-section each slot 64 is arcuate and of a radius equal of that of the cylinder received therein, and its side walls define slightly more than a semi-circle so that it is somewhat narrower at its mouth than inwardly thereof. The cylinder is thus confined in the slot against radial motion relative to the body 11' but projects from the mouth of the slot all along its length. At its outer end each slot is closed, which is to say that it terminates short of the outer face of the body member; but it opens at its inner end to the surface 45 of the main body member that is overlain by the smaller body member 44. Hence the cylinders 63 can be axially inserted into their slots from the inner face of the main body member, and they are confined against axial movement by securement of the smaller body member to the main body member.

It will be observed that with the hub adapter in place on the shaft 51, and with the caliper body in place on the hub adapter, the wheel can be installed on a bicycle in a conventional manner, and its axle shaft can be adjusted along the slot 59 as necessary for chain tension, all without interference from the brake apparatus.

The fixed brake pad 19 can comprise a facing member of suitable friction material secured to the leg portion 18 of the smaller body member 44 in flatwise opposing relation to the inner surface 15 of the rotor. The brake pad is somewhat rectangular in outline, being elongated in the circumferential direction of the rotor, but its longer edges are curved in arcs that center on the wheel axis so that all portions of its surface can engage the rotor.

The movable brake pad 20 comprises a block-like shoe member 65 that is of the same general shape as the fixed brake pad. A friction facing 66 overlies the surface of the shoe member that opposes the rotor. The movable brake pad is of course carried on the inner face of the main body member 43, spanning its bifurcations.

For holding the movable brake pad in place on the body, the shoe member has a pair of tabs or lugs 67, one projecting lengthwise from each end thereof, and the main body member has opposing lugs 68, one adjacent to each lug 67 on the shoe member. A coiled garter spring 69 encircles each lug 67 on the shoe member and its contiguous lug 68 on the body. The garter springs of course permit the shoe member to have limited movement relative to the caliper body, but they tend to maintain the shoe member in a normal brake-disengaged position, spaced from the adjacent outer surface of the rotor and engaged with the inner face of the main body member.

A bent lever or bell crank 70 that overlies the inner face of the main body member provides for actuation of the movable brake pad. A longer arm 71 of the lever projects upwardly beyond the caliper body for connection to the cable 9, while the shorter arm 72 of the lever is confined between the shoe member 65 and the inner face of the body and is so oriented that its free end swings generally in directions circumferentially of the rotor and transverse to the length of the caliper body. An inwardly projecting pin 73 or the like, fixed on the free end of the shorter lever arm 72, rides in a closely fitting slot 73' in the shoe member to transit motion of that lever arm to the movable brake pad. It will be seen that forward motion of the longer lever arm 71, in response to tension on the cable 9, cause the movable brake pad to move along a path and in a direction which correspond to normal movement of the portion of the rotor engaged by the movable brake pad. It will also be noted that the relationship of the shorter and longer arms of the bent lever 70 is such that the brake pad has a relatively small movement in response to a relatively large movement of the cable, so that a small force on the handlebar actuator lever 7 is translated into a large force on the brake pad.

Figure 2:
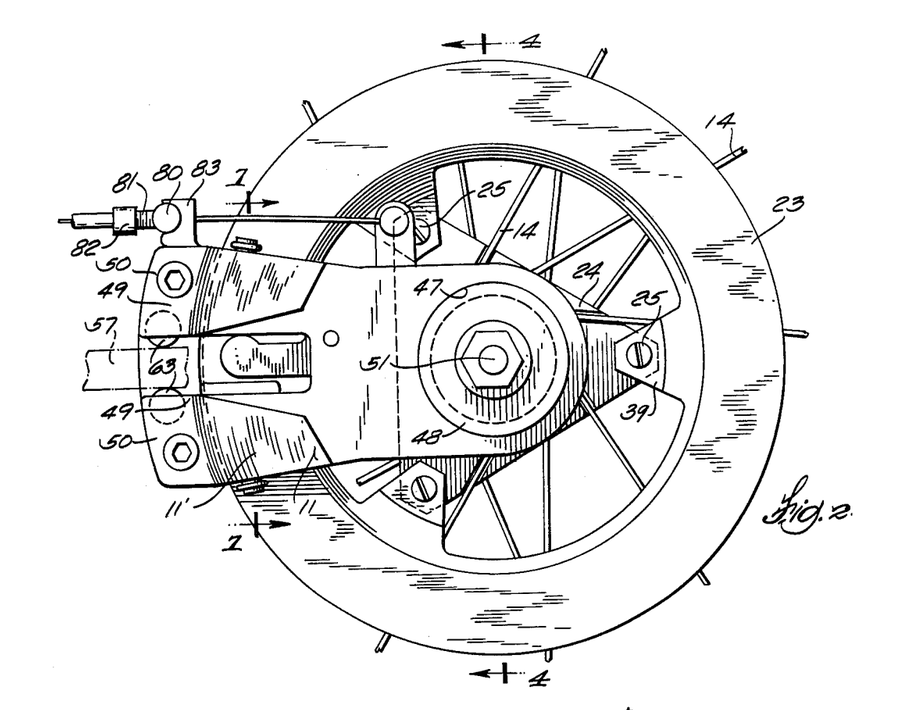
FIG. 2 is a view in side elevation of the caliper assembly of the disc brake apparatus of this invention, shown in operative relationship to its rotor.
Figures 2, 6, 7, 8:
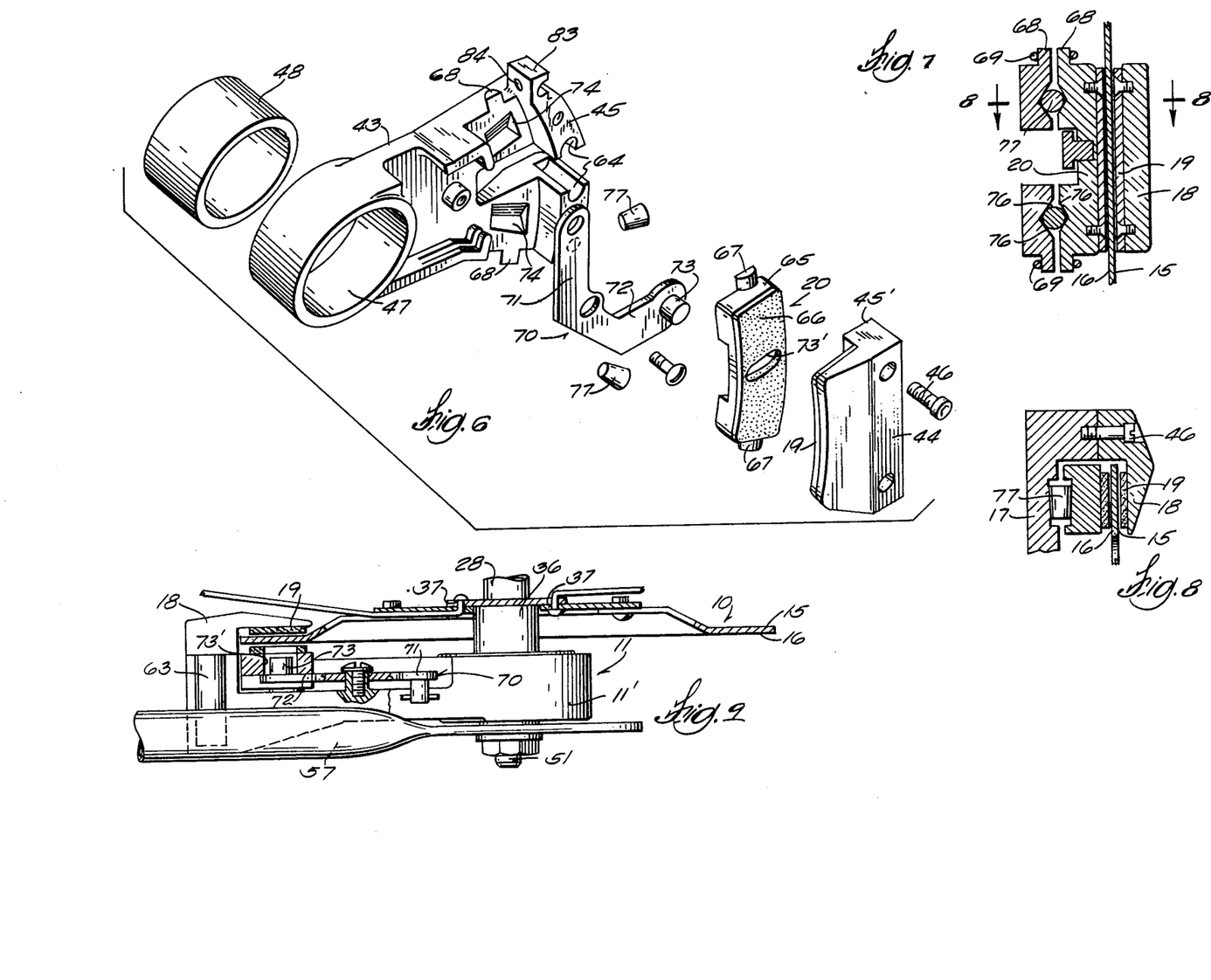
FIG. 6 is a disassembled perspective view of the caliper body assembly.
FIG. 7 is a fragmentary sectional view taken on the plane of the line 7—7 in FIG. 2.
FIG. 8 is a fragmentary sectional view taken on the plane of the line 8—8 in FIG. 7.
Figure 3:
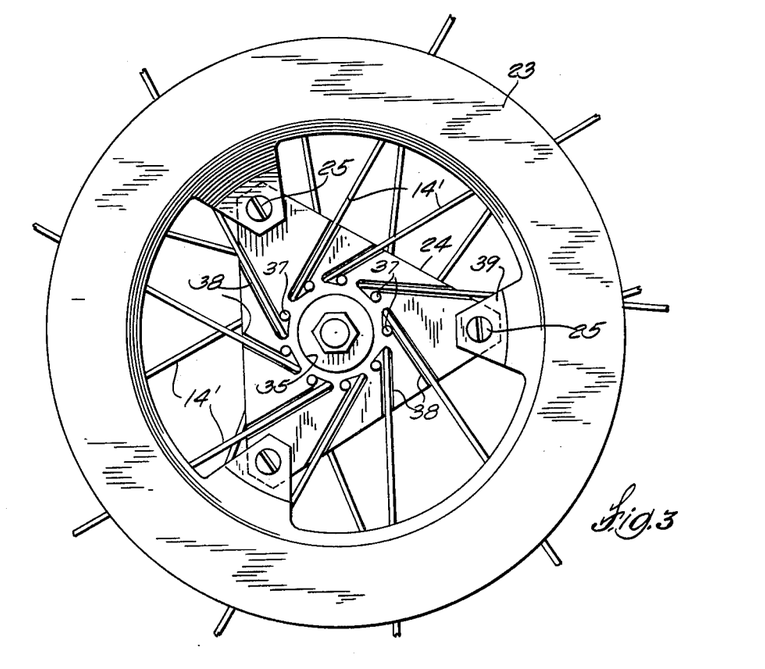
FIG. 3 is a view in elevation showing how the rotor is attached to a wheel.

The brake applying motion of the movable brake pad is a compound one in which the brake pad has one component of motion along an arcuate path defined by the curvature of its longitudinal edges and has another component of motion axially toward the rotor; but in such motion the brake pad is always maintained in an orientation such that its friction surface is parallel to the surfaces of the rotor. To cause the brake pad to have such an axial component of motion while it is maintained in the orientation just mentioned, the caliper body member 43 and the shoe member 65 have pockets 74 and 75, respectively, that open towards one another and define cooperaing ramp surfaces. There are two such pockets 74 in the caliper body, one in the inner face of each of its bifurcations, and two pockets 75 in the shoe member, spaced and located to open into the pockets 74. As best seen in FIG. 7, each pocket is of substantially V-shaped cross-section, to provide a pair of oppositely inclined ramp surfaes 76. The two inclined surfaces of each pocket converge towards a plane that contains the axis of the wheel, so that as viewed in plan the two pockets are in somewhat splayed relation to one another. Furthermore, each pocket diminishes in depth toward the wheel axis (that is, rearwardly), and since the ramp surfaces 76 of the pocket are flat, each pocket is slightly fan-shaped and forwardly divergent as viewed in plan.

A tapered roller 77 is confined in each pair of opposing pockets, to cooperate with the opposite ramp surfaces 76. The largest diameter end of the roller is in the deepest portion of the pocket, and the taper of the roller is such as to correspond to the depthwise taper of the pockets so that the desired orientation of the brake pad friction surface is maintained.

It will be apparent that as the movable brake member is moved lengthwise by swinging of the lever 70, the rollers 77, confined between the opposing ramp surfaces of the respective pockets 74 and 75, will cooperate with those ramp surfaces to impart to the shoe member a component of motion away from the caliper body member 43 and towards the rotor.

It will be understood that the angle of taper of the rollers and pockets is so selected as to cause the brake pad to move in an arc corresponding to the path of motion of the portion of the rotor that it engages. For purposes of clarity the taper of the rollers and pockets is exaggerated in FIG. 6.

Attention is directed to the fact that the two rollers 77 cooperate with the respective ramp surfaces in the pockets 74 and 75 to provide a support for the movable brake pad that is totally stable and by which it is maintained properly oriented at all times, and that they guide the movable brake pad for motion in the proper directions but permit it to have nearly frictionless motion relative to the caliper body.

When the movable brake pad contacts the rotor, frictional drag of the rotor upon the brake pad tends to drive the latter farther in the brake applying direction and thus more forcefully into engagement with the rotor, to afford a degree of self-energization of the brake. It will be appreciated that the angle of inclination of the ramp surfaces 76 of the pockets will control the relationship between the components of arcuate and of axially inward motion of the brake pad, and hence will control the degree to which self-energization is afforded. While some amount of self-energizing action is highly desirable, it should not be excessive lest the braking action be lacking in "feel" and have a tendency to cause wheel locking.

The manner in which the fixed brake pad 19 is caused to engage the rotor, due to movement of the caliper body in reaction to force that the movable brake pad exerts against the rotor, has been described above.

A tension spring 78, reacting between the bent lever 70 and the main body member, biases that lever in the direction opposite to that of brake application. That tension spring therefore cooperates with the garter springs 69 to urge the movable brake pad towards its normal position in which its friction surface is slightly spaced from the rotor.

No special provision is made for disengaging the fixed brake pad 19 from the rotor when the brake is released, and none is necessary. The body has been found to move back promptly to a position in which the fixed brake pad is clear of the rotor. Evidently, the very slight amount of runout that is inevitably present in the inner surface 15 of the rotor is sufficient to kick the body to its brake-disengaged position during the first revolution of the wheel following brake release.

For smooth brake application it is essential that the cable 9 as well as other parts of the brake actuating mechanism shall have a free and efficient action. To this end, the rear end portion of the cable extends through a self-aligning cable guide 79 by which it is maintained oriented as nearly as possible at right angles to the lever arm 71 to which it is connected. The cable guide comprises a cylinder 80 of nylon or the like having a metal tube 81 extending transversely therethrough that receives the cable with an easy sliding fit. As is conventional, a sheath in which the cable is enclosed has a detachable connection 82 to the front end of the guide tube 81. The cylinder 80 is supported by a lug 83 that projects upwardly from the top of the main body member 43 near its front end. An arcuate groove in the front face of the lug receives the cylinder with a fit that allows the cylinder to rotate easily. The portion of the cable that extends to the rear of the guide tube 81 passes through a bore 84 in the lug 83 that is sufficiently larger in diameter than the cable to accommodate substantial lateral motion thereof. Note that the lug 83 so locates the cable guide that the rear end portion of the cable is substantially at right angles to the arm 71 of the bent lever when that lever is in the brake-disengaged position to which it is biased.

From the foregoing description taken with accompanying drawings it will be apparent that this invention provides disc brake apparatus which is nicely adapted for bicycle applications by reason of its light weight, compactness and efficiency, and which brings an unprecedented convenience and safety to hand-operated bicycle braking. It will also be apparent that the apparatus of this invention is very versatile in that it can be installed on practically any make, model or style of bicycle without requiring any modification of the bicycle structure, without detracting from the appearance of the bicycle and without interfering in any way with its normal operation or with the installation on it of commonly used accessories.

Those skilled in the art will appreciate that the invention can be embodied in forms other than as herein disclosed for purposes of illustration.

The invention is defined by the following claims:

1. A caliper brake assembly for a bicycle wheel or the like that is rotatably mounted on relatively fixed structure and normally rotates only in one direction, said assembly being cooperable with a disc-like rotor that has axially opposite flat faces and is constrained to concentric rotation with the wheel, said assembly comprising:
  A. a body having a connecting portion and a pair of opposing caliper legs that project in one radial direction from said connecting portion, said legs being spaced apart in axial directions and each having substantial extent in circumferential directions, one of said legs having substantially greater extent in said radial direction than the other;
  B. attachment means on said one leg for securing said body to fixed structure in straddling relation to an edge portion of a rotor to have the caliper legs overlying the opposite faces of the rotor, said attachment means being arranged to confine the body against motion in said radial and circumferential directions;
  C. a first brake pad on said other caliper leg having a substantially flat friction surface facing in the axial direction towards said one caliper leg and engageable with the adjacent face of a rotor straddled by the body;
  D. a movable brake pad carried on said one caliper leg, having a substantially flat friction surface that faces the friction surface on said first brake pad and is engageable with the opposite face of a rotor straddled by the body;
  E. cooperating means on said one caliper leg and on the movable brake pad confining the latter against motion relative to the body in radial directions and other than substantially translatory motion in other directions, said cooperating means comprising
    1. a lug on the movable brake pad at each of the circumferentially opposite ends thereof, each of said lugs projecting outwardly in a circumferential direction from its circumferential end of the brake pad,
    2. a pair of lugs on said one caliper leg, one for each of said lugs on the movable brake pad, said lugs on said one caliper leg projecting in said circumferential directions from the circumferentially opposite sides of said one caliper leg and each opposing its lug on the movable brake pad and being adjacent thereto; and
    3. a pair of coiled garter springs, one embracing each of said lugs on the movable brake pad and the adjacent lug on said one caliper leg and thereby urging the movable brake pad in the axial direction away from the first brake pad;
  F. a bell crank overlying said one caliper leg and pivoted thereto to swing about a fulcrum axis which extends in said axial directions, said bell crank having
    1. one arm projecting in one of said circumferential directions beyond said one caliper leg and
    2. another arm projecting substantially radially and having a connection with the movable brake pad whereby swinging of the bell crank imparts motion in said circumferential directions to the movable brake pad;
  G. cooperating ramp means on the body and on the movable brake pad whereby force imposed upon the movable brake pad in said one circumferential direction produces substantially translatory movement of the movable brake pad relative to the body, obliquely in said one circumferential direction and in the axial direction towards the first brake pad, said ramp means defining opposing surfaces on the body and on the movable brake pad, respectively, at least one of said surfaces being inclined axially and circumferentially to the friction surface of the movable brake pad; and
  H. biasing means reacting between the body and said bell crank to urge the latter to swing in the direction that carries the movable brake pad in the opposite circumferential direction.

2. The caliper brake assembly of claim 1 wherein said bell crank has
  a. its said other arm lying between said one caliper leg and the movable brake pad, and
  b. has a protuberance on the terminal end portion of its said other arm that projects in one of said axial directions and is slidably received in a slot in the movable brake pad that is elongated in said radial directions to provide said connection with the movable brake pad.

3. The caliper brake assembly of claim 1, wherein both of said respective surfaces defined by the ramp means are inclined obliquely to the friction surface of the movable brake pad, further characterized by:

roller means confined between said respective surfaces to enable the movable brake pad to move relative to the body substantially without friction therewith.

4. The caliper brake assembly of claim 1, wherein said other arm of the bell crank has cable connection means on its terminal end portion, further characterized by:
1. a cable guide tube having a bore therethrough in which an actuating cable is receivable with a sliding fit, and
2. means mounting said cable guide tube on the body for swiveling of said tube about a pivot axis which extends in said axial directions and which is intermediate the ends of said tube and transverse to the axis of its bore, said tube mounting means being so located that a line through said pivot axis and said cable connection means is substantially perpendicular to a line through the cable connection means and said fulcrum axis.

5. The caliper brake assembly of claim 1, wherein said attachment means provides for limited movement of the body in said axial directions relative to the fixed structure to which the body is secured, further characterized by:

said first brake pad being fixed to said other leg of the body and being engageable against its adjacent face of a rotor straddled by the body in consequence of reaction of the body to force which the movable brake pad exerts against the rotor upon its engagement therewith.

6. A disc brake system comprising a rotor constrained to rotation with a member to be braked and having a flat, annular surface that faces in one axial direction and has its axis coinciding with the axis of said member, a caliper body confined against motion in radial and circumferential directions relative to the rotor, and a brake pad carried by the caliper body and having a substantially flat friction surface, said brake pad being movable relative to the caliper body to bring its friction surface into and out of flatwise engagement with said surface of the rotor, said disc brake system being characterized by:
A. the caliper body having a pair of pockets which open toward said surface on the rotor and which are spaced apart in the circumferential direction, each of said pockets having a flat ramp surface which is inclined in an oblique direction axially and circumferentially relative to said surface on the rotor;
B. the brake pad having, in a surface thereof that is opposite its said friction surface, a pair of pockets which are so spaced and arranged as to open into said pockets in the caliper body so that each pocket in the caliper body is paired with a pocket in the brake pad, each of said pockets in the brake pad having a flat ramp surface which opposes the ramp surface of its paired pocket in the caliper body and has a corresponding axial and circumferential inclination;
C. a pair of rollers, each of said rollers being confined between opposing ramp surfaces of paired pockets and cooperating with said ramp surfaces to cause force on the brake pad in one circumferential direction to result in oblique translatory motion thereof in said circumferential direction and in the axial direction toward said surface on the rotor;
D. a bell crank actuable in one direction of swinging motion for imparting force in said one circumferential direction to the brake pad, said bell crank
1. being fulcrumed on the body to swing about an axis which extends substantially in said axial directions,
2. having one arm which extends substantially in one of said circumferential directions and projects beyond the body to be accessible for actuation, and
3. having another arm which extends substantially in a radial direction, is confined between the body and the brake pad, and has a motion transmitting connection with the brake pad;
E. retaining means for substantially confining the brake pad to circumferential and radial motion relative to the body and for biasing the brake pad in the axial direction away from the rotor, said retaining means comprising
1. a lug on each circumferential end portion of the brake pad, each lug projecting outwardly in a circumferential direction from its end of the brake pad,
2. a circumferentially projecting lug on the body opposing each lug on the brake pad, and
3. a garter spring embracing each lug on the brake pad and its opposing lug on the body; and
F. biasing means reacting between the body and the bell crank to urge the latter in the opposite direction of its swinging motion.

7. The disc brake system of claim 6, further characterized by:
G. each of said rollers being tapered along its length and having its smaller diameter end nearer the rotor axis so that circumferential movement of the brake pad is in an arc that closely corresponds to the path of movement of that portion of said surface of the rotor that the brake pad engages; and
H. said opposing ramp surfaces of each pocket pair further having opposite inclinations in the radial direction, at angles corresponding to the taper of the roller confined between them, so that said friction surface on the brake pad is always maintained parallel to said surface on the rotor.

8. A brake assembly for cooperation with a disc rotor which is constrained to coaxial rotation with a member to be braked, such rotation being in relation to relatively fixed structure, said assembly being of the type comprising a body securable to said relatively fixed structure and having a surface that extends in circumferential and radial directions and faces in one axial direction, and a brake pad carried by said body, overlying said surface thereof, said brake pad having a substantially flat friction surface that extends in said circumferential and radial directions and faces in said one axial direction, and being movable relative to the body to bring its said friction surface into and out of flatwise engagement with an opposing flat, annular, coaxial surface on the rotor, said brake assembly being characterized by:
A. cooperating ramp means on said brake pad and on the body, operative to cause force exerted on the brake pad in one of said circumferential directions to produce translatory motion of the brake pad relative to the body obliquely in said circumferential direction and in said one axial direction;
B. an actuating lever fulcrumed on the body to swing about an axis that extends in the axial directions, said lever having an arm that projects beyond the body to provide for its actuation;
C. cooperating connection means on said brake pad and on said lever, spaced from its fulcrum axis, by which swinging motion of the lever in one direction about its fulcrum axis constrains the brake pad to move in said one circumferential direction relative to the body, said connection means permitting said brake pad to have motion in the axial directions relative to the lever; and
D. retaining means for substantially confining the brake pad to circumferential and radial motion relative to the body and for biasing the brake pad in the opposite axial direction, said retaining means comprising
1. a lug on each circumferential end portion of the brake pad, each lug projecting outwardly in a circumferential direction from its end of the brake pad,
2. a circumferentially projecting lug on the body opposing each lug on the brake pad, and
3. a garter spring embracing each lug on the brake pad and its opposing lug on the body.

9. The brake assembly of claim 8, further characterized by:
E. spring means reacting between said lever and the body to bias the lever in the opposite direction of its swinging motion.

* * * * *